Sept. 22, 1959 W. B. THOMPSON ET AL 2,905,489
HIGH-PRESSURE FLUID SEALS
Filed Nov. 1, 1956
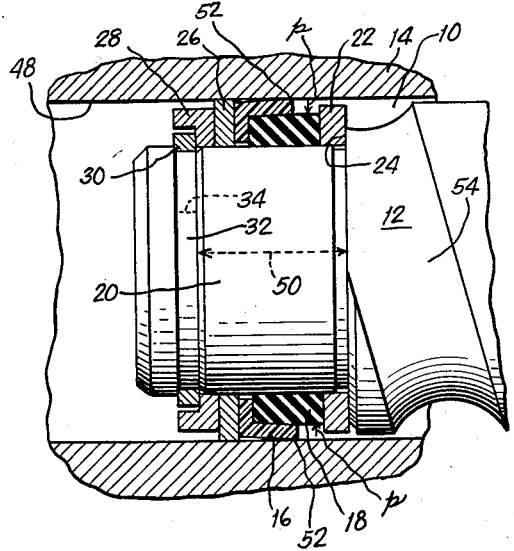
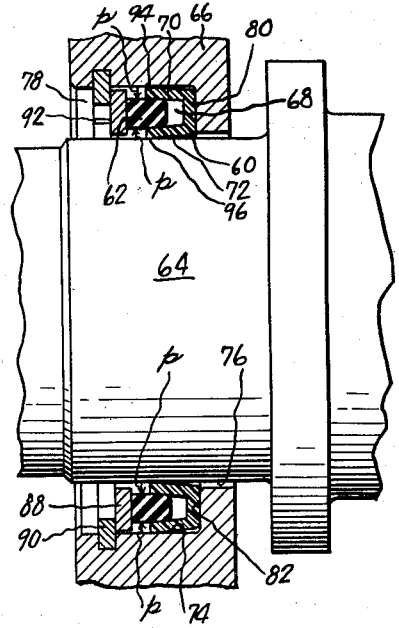
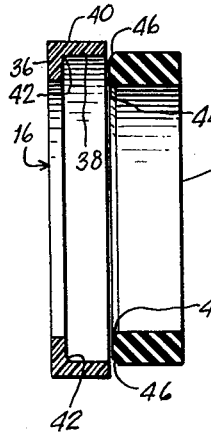
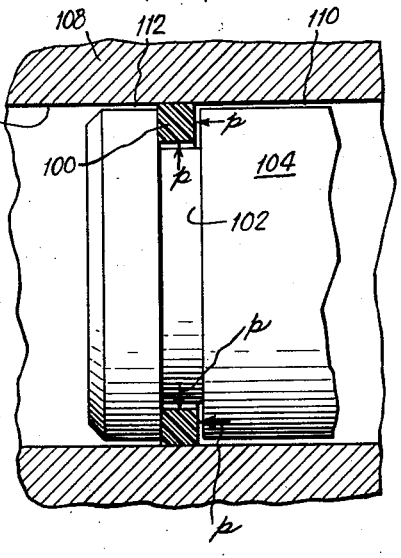
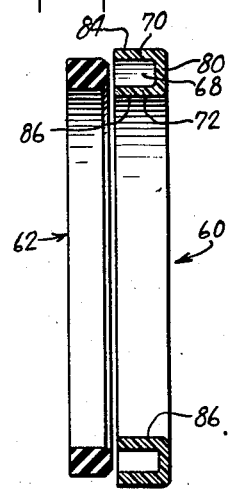
INVENTORS:
WILLIAM B. THOMPSON
RAY J. WROBBEL
BY
*Robert Henderson*
ATTORNEY United States Patent Office 2,905,489
Patented Sept. 22, 1959

2,905,489
HIGH-PRESSURE FLUID SEALS

William B. Thompson and Ray J. Wrobbel, Saginaw, Mich.; said Wrobbel assignor to The Garlock Packing Company, Palmyra, N.Y., a corporation of New York, and said Thompson assignor to General Motors Corporation, Detroit, Mich., a corporation of Delaware Application November 1, 1956, Serial No. 619,781

6 Claims. (Cl. 286—26)

This invention relates to sealing devices, usually annular, for effecting a seal against escape or passage of fluid, under high pressure, between relatively movable machine elements.

In deriving such sealing effects, one is faced chiefly with several problems, (1) the high pressure strongly tends to blow a flexible sealing element out of place or into a distorted condition which destroys its effectiveness, (2) the high pressure applied to flexible sealing means develops such a high friction condition as to impose an objectionable drag upon the relative movement of related machine elements, and (3) most materials heretofore employed in such sealing devices have been more or less absorbent, hence, often adversely affected by absorption of liquid or gas which may cause objectionable swelling, drying or decomposition of the sealing means.

An important general object of this invention, therefore, is to provide a high-pressure, fluid seal in which the stated problems are adequately solved to overcome the mentioned objectionable conditions.

An important, more or less specific object is to provide environment, in a sealing device, which will permit satisfactory use of substances similar to polytetrafluoroethylene (commonly known and hereinafter referred to for convenience as "Teflon") as the principal sealing medium in a high-pressure, fluid seal.

Teflon has heretofore been employed in various ways for sealing purposes, but prior efforts to utilize such material in high-pressure, fluid seals evince a lack of appreciation that the pressure to be contained by the seal may be utilized to stretch or circumferentially elongate a continuous or non-split annulus of Teflon or might oppose its construction whereby to increase its sealing effectiveness. Probably less frequently, such pressure may, in certain arrangements, circumferentially compact or oppose such stretching of such an annulus to increase its sealing effectiveness.

The present invention, as preferably practiced, comprehends the use of a single, continuous or non-split annulus of Teflon or other substantially hard, non-absorbent, elastically stretchable material with a low coefficient of friction, disposed in an annular groove in one of two relatively movable machine elements to be sealed and of such disposition, shape and size in and in relation to said groove and adjacent portions of the other of such machine elements as to be expanded radially by the pressure of the fluid to be sealed to facilitate such sealing or, for the same purpose, to be prevented by such pressure from contracting radially. As will hereinafter be shown, the application of such pressure to the annulus may be either direct or through the medium of a second, relatively soft, resilient annulus.

In the accompanying drawing, three of numerous possible embodiments of this invention have been shown for illustrative purposes without, however, limiting the invention to those particular embodiments.

In said drawing:

Figure 1 is an axial sectional view of a seal according to a first preferred embodiment of this invention.

Fig. 1A is an axial sectional view of two ring portions of the seal of Fig. 1, prior to assembly.

Figs. 2 and 2A are views similar in character to Figs. 1 and 1A respectively, but illustrate a second preferred embodiment of the invention.

Fig. 3 is a view of the same character as Figs. 1 and 2, but illustrating a third preferred embodiment of the invention.

The first embodiment, illustrated in Figs. 1 and 1A, comprises a sealing assembly for sealing or containing fluid under relatively high pressure as, for example, of the order of 1000 p.s.i. in an annular area 10 between a shaft 12 which is rotatable in and longitudinally movable relatively to a surrounding casing or machine part 14.

The principal parts of the sealing assembly are a continuous or non-split sealing ring 16 of Teflon of L shape in axial section and a fluid-pressure-transmitting ring 18 of relatively soft rubber or synthetic rubber (hereinafter referred to for convenience merely as "rubber"). These two rings, internested as shown in Fig. 1, are mounted on a reduced end portion 20 of shaft 12 between an inner washer 22, which is backed against a shoulder 24 delineating the reduced portion 20 and the remainder of the shaft, and an outer washer 26.

The assembly thus far described is held in place on the shaft portion 20 by a locking ring 28 of angular shape in cross section and a somewhat resilient, contractile, split snap-ring 30 which spreads sufficiently to enable it to slip over the end of reduced shaft portion 20 and contract into its locking position, as shown, in an annular groove 32 in the portion 20. The split in the ring 30 is indicated by a dotted line at 34.

Fig. 1A shows the rings 16 and 18 as manufactured and shows each to the same scale. They are also shown in said figure relatively positioned as immediately before being brought together in assembly. From Fig. 1A it may also be seen that the Teflon ring 16 has a radial flange 36 and a cylindrical flange 38 and, more particularly, that the outer surface 40 of the flange 38 is cylindrical; also that the outside diameter of the ring 18 is preferably slightly greater than the inside diameter of the cylindrical flange 38 of the Teflon ring and that the axial dimension of the ring 18 is considerably greater than the axial dimension of the inside surface of the flange 38. The juncture of the inside surface of flange 38 and the adjoining inside surface of flange 36 is preferably rounded as at 42 and the inner end of ring 18 is preferably chamfered or beveled at its inner and outer peripheries as at 44 and 46.

The inside diameter of the ring 18 is goverened largely by the diameter of the shaft portion 20 on which it is to be disposed in use, and, preferably, should be slightly less than the diameter of said shaft portion so that it will expand slightly when put into place and will fit snugly on said shaft portion. The outside diameter of the flange 38 of ring 16, and, indeed of the entire ring 16 as manufactured, is governed largely by the diameter of the inner cylindrical surface 48 of machine part 14. The ring 16, preferably, should be a loose fit in relation to said cylindrical surface 48. The washer 26 may be a close but not a tight fit against the surface 48 and a close fit upon the reduced end portion 20 of the shaft, so that, if the latter requires bearing support to relieve the ring 16 of bearing wear, the washer 26 may give that support.

In assembling the various described rings and washers on shaft portion 20, the rings 18 and 16 may either be separately applied or may first be internested and then applied together to the shaft. After locking ring 28 has been pushed into place in the assembly procedure but before application of snap-ring 30, the total axial dimension of the several already applied rings and washers at their inner peripheries will be somewhat greater than the shaft dimension indicated by the broken-line arrow 50. Then, when snap-ring 30 is forcibly pushed axially into place wherein it snaps into groove 32, the axial compression of ring 18 causes it to become distended within the flange 38 of ring 16, thereby forcing the outer edge or lip 52 of said flange into sliding sealing contact with the cylindrical surface 48 of machine part 14.

The shaft 12, as illustrated, may be as employed in a steering mechanism of an automobile wherein the shaft is spirally grooved as at 54 to accommodate an endless series of ball bearings (not shown) in a manner well understood by those familiar with such steering mechanisms. In such an arrangement, the shaft not only turns, but also undergoes axial movement relatively to machine part 14. It should be understood, however, that the present invention is also useful with a shaft or rod which moves either only rotationally or only axially in relation to an associated machine part.

It will be understood that, in an installation as just described, high fluid pressure being contained in area 10 would be effective radially inwardly upon the outer cylindrical surface of that portion of ring 18 which protrudes from ring 16, as indicated by arrows p, p. The thus applied pressure, effective through the mass of ring 18, causes the latter to tend to expand or become distended radially outwardly against flange 38 of ring 16 and also to expand axially against washer 26. Thus, the flange 38 is held firmly in sliding sealing contact with surface 48 more or less in proportion to the contained or sealed pressure. The pressure thus developed in ring 18 also causes the latter to more tightly grip shaft portion 20, thereby preventing pressure leakage along the latter.

It may be noted that the sliding sealing effect is localized at the lip 52 which, during initial usage, is only in a thin-line engagement with surface 48 and that, even after some wear, which, with Teflon, is rather slow, said engagement will still be only along a circular line, although a slightly broadened line. Assuming that the ring 16 as manufactured is a loose fit with respect to surface 48 as recommended, the pressure developed in the ring 18 cannot cause the entire outer cylindrical surface of the ring 16 to enter into forcible engagement with surface 48 because the radial flange 36 of the latter ring would prevent such forcible engagement.

Inasmuch as the area of sliding sealing engagement is localized as just described, it follows that the friction developed at the sliding sealing surfaces is greatly minimized with a resultant minimum of slide or frictional drag.

Although such slide drag is minimized by reason of the described initial loose fit of ring 16 and the localized line contact of the latter with surface 48, a further minimizing of drag results from the fact that Teflon has a very low coefficient of friction.

Another advantage results from the described combination of the sealing ring 16 of Teflon with the pressure-transmitting ring 18 of rubber. It is well known that rubber has a high coefficient of friction and it can be appreciated that, if the ring 16 were of leather or impregnated fabric, the outer surface of the rubber ring 18 would stick to the inner surface of flange 38 so that the expansion of the latter would be accomplished through distension of only the rubber mass of ring 18 originally within the confines of flange 38 plus the slight internal shifting of rubber in the ring 18. However, by combining the rubber and Teflon rings, as herein described, the application of pressure arrows p, p causes a slight additional length of the rubber ring to slide into radial registry with flange 38 so that the expansion of the latter is more readily accomplished to render the seal as a whole more sensitive to the contained pressure to enhance the sealing effect as required at higher pressures.

It should also be observed that the two washers 22 and 26, together with the cylindrical surface of reduced shaft portion 20, form an annular groove within which Teflon ring 16, or a comparable Teflon ring, is radially expanded or contracted to enhance its sealing effect. Such an annular groove or its equivalent is characteristic of this invention.

The second embodiment, illustrated in Figs. 2 and 2A, differs from the first embodiment chiefly in that a continuous or non-split Teflon sealing ring 60 is U shaped in axial section rather than L shaped and in that a rubber, fluid-pressure-transmitting ring 62, instead of forming a direct seal with either a shaft, as with ring 18 of the first embodiment, or with a machine-casing portion, extends slidably into an annular groove 68 in ring 60 and spreads axial flanges 70 and 72 outwardly and inwardly, respectively, into static sealing association with an internal cylindrical surface 74 of machine-casing portion 66 and into sliding sealing association with cylindrical surface 76 of shaft 64.

The groove 68 of the ring 60 faces high pressure area 78 and radial wall 80 backs against shoulder 82 of machine-casing portion 66. As manufactured, ring 60 has outer and inner cylindrical surfaces 84 and 86 defining a radial width of said ring preferably slightly less than the width of the space between surfaces 74 and 76, and rubber ring 62 preferably is slightly thicker radially than the initial radial width of the groove 68.

In installing the seal of the second embodiment, ring 60 is pushed into place against shoulder 82, then ring 62 is pushed partly into groove 68. The ring 62 is followed by a washer 88, after which an expanding snap-ring 90, split at 92, is pushed into place, the latter step being accompanied by sufficient force to telescope ring 62 more completely into groove 68. This telescoping forces the edges or lips 94 and 96 of flanges 70 and 72 into sealing engagement respectively with the cylindrical surfaces 74 and 76.

As with the first embodiment, high fluid pressure in area 78 is effective upon the exposed outer cylindrical surface of rubber ring 62 and, additionally, is effective upon the exposed inner cylindrical surface of the rubber ring. The mentioned application of pressure is indicated by arrows p, p in Fig. 2. The thus applied fluid pressure not only slides the rubber ring 62 slightly further into groove 68 but also causes the rubber of ring 62 to expand radially inwardly and outwardly in the area between flanges 70 and 72. The mentioned sliding and expansion has the effect of enhancing the sealing engagement of the latter flanges with surfaces 74 and 76.

It will be seen that, as with comparable parts in the first embodiment, the Teflon ring 60 effects, forcefully, only a line, sliding sealing engagement with a related part to be sealed and the rubber ring 62 slides into the Teflon ring 60 as well as expands therein to enhance the sealing effect more or less proportionately to the pressure being contained. Also, in the second embodiment, the washer 88 with surface 74 and shoulder 82 forms an annular groove within which the rings 60 and 62 function.

The third embodiment, illustrated in Fig. 3, utilizes the described principle of fluid, radial expansion of a Teflon ring but does not utilize any wedging action to achieve such expansion. The illustrated third embodiment comprises a continuous or non-split Teflon ring 100, of rectangular shape in axial section, disposed within an annular groove 102 in a piston or rod 104 which is arranged to reciprocate within a bore 106 in a cylinder or machine-casing part 108.

The ring 100 is manufactured with an outside diameter preferably slightly greater than the diameter of the bore 106 and an inside diameter appreciably greater than the diameter of groove 102 at the latter's bottom surface. The ring is forcibly stretched and slipped over the end of the rod 104 and then permitted to contract into the groove 102, after which the rod, with the ring thereon, is pushed into the bore 106.

Assuming high fluid pressure to be present in annular area 110 toward the right of ring 100, the pressure pushes said ring to a leftward position in its groove, as shown, and the pressure becomes effective upon the inner cylindrical surface of the ring to impose thereupon a strong expansive force which holds the ring 100 in enhanced sliding sealing engagement with the wall of bore 106 more or less in proportion to the contained pressure. The described application of pressure is indicated by arrows p, p in Fig. 3.

If a condition of high pressure shifts to the annular area 112 toward the left of ring 100, as would be the case if piston 104 is double-acting, the pressure would push the ring 100 to a rightward position in its groove and would then act in the manner already described to expand the ring with the same result as already stated.

It should be apparent, from the foregoing description, that utilization of this invention yields an inexpensive, sturdy, durable, easily assembled sealing combination, subject to very low friction drag, giving a sealing effect enhanced in response to contained high pressure. It should also be appreciated that the present inventive concept may be utilized in various other ways without, however, departing from the invention as set forth in the following claims.

We claim:

1. High-pressure fluid sealing means for effecting a seal between two telescoping, relatively movable machine elements, said means comprising, in combination, portions of said elements with spaced opposed cylindrical surfaces defining an annular packing space therebetween, spaced abutment members at opposite ends of said packing space, a continuous ring in said packing space, said ring being of material which is approximately the same as polytetrafluoroethylene with respect to hardness, absorbency, elasticity and friction characteristics, said ring having a radial wall in engagement with one of said abutment members and spaced from one of said cylindrical surfaces and having also an approximately cylindrical flange extending adjacent to and non-parallel to said one cylindrical surface from said radial wall into engagement at the free edge of said flange with said one cylindrical surface and to a plane within said space substantially spaced from the other of said abutment members, and an annulus of relatively soft rubber a first substantial portion of which extends between the other of said cylindrical surfaces and said approximately cylindrical flange in intimate association with the latter, and a second substantial portion of which protrudes axially beyond the free edge of said approximately cylindrical flange into engagement with said other abutment member; said annulus in said defined relationship being substantially undeformed in the absence of material ambient fluid pressure, and cylindrical surface areas of said protruding portion of the annulus being exposed to ambient fluid pressure, thereby adapting said annulus to transmit such pressure to said ring to urge the latter's said radial wall firmly against said abutment member which it engages and the free edge of said cylindrical flange firmly against said adjacent cylindrical surface.

2. Sealing means according to claim 1, said ring being L shaped in cross section and said annulus being in intimate association with both said approximately cylindrical flange and said other cylindrical surface.

3. Sealing means according to claim 2, said approximately cylindrical flange being in sliding, sealing engagement with one of said cylindrical surfaces which is an inner surface of an outer one of said machine elements and said other cylindrical surface being an outer surface of an inner one of said machine elements.

4. Sealing means according to claim 1, said radial wall being spaced from both of said cylindrical surfaces.

5. Sealing means according to claim 4, said ring being U shaped in cross section and having a second such approximately cylindrical flange which extends adjacent to and in non-parallelism to said other of said cylindrical surfaces and into engagement, at its free edge, with said other cylindrical surface.

6. Sealing means according to claim 5, said second portion of said annulus having outer and inner cylindrical surfaces, both of which are exposed to ambient fluid pressure.

References Cited in the file of this patent

UNITED STATES PATENTS

| | | |
|---|---|---|
| 2,567,527 | Parks | Sept. 11, 1951 |
| 2,825,590 | Sutherland | Mar. 4, 1958 |

FOREIGN PATENTS

| | | |
|---|---|---|
| 884,439 | Germany | July 27, 1953 |
| 704,117 | Great Britain | Feb. 17, 1954 |
| 1,049,256 | France | Aug. 19, 1953 |